June 14, 1949.                    H. SVENSSON                        2,473,480
                                LOG IMPREGNATING DEVICE
                                 Filed March 9, 1943
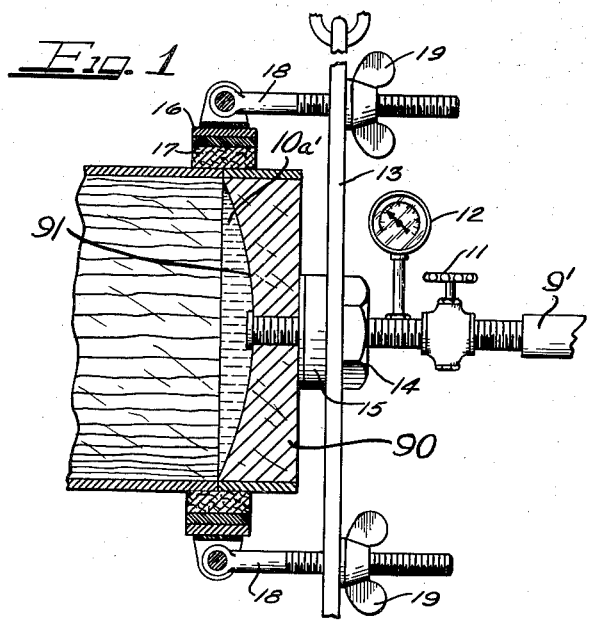
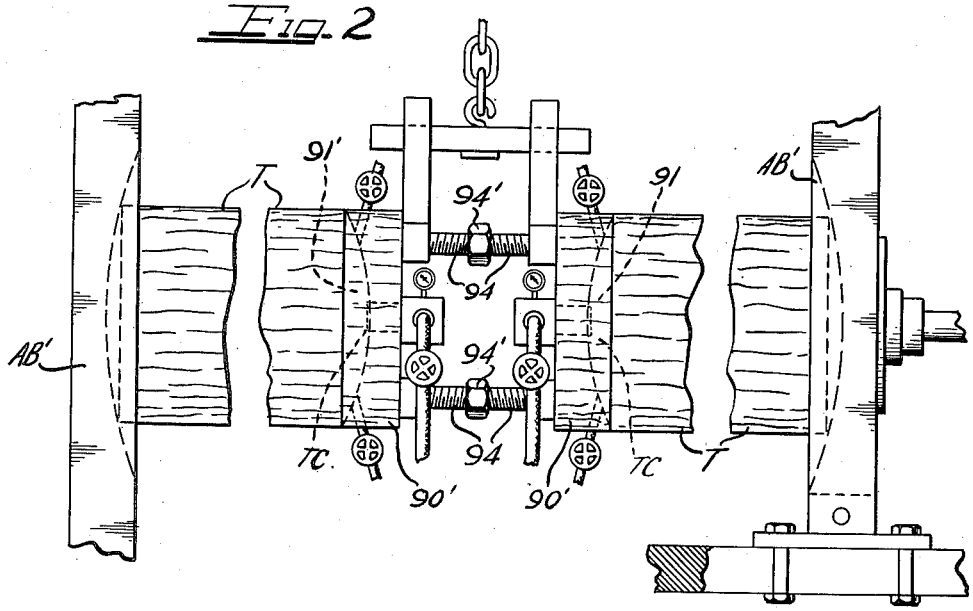
Inventor
HENRY SVENSSON
by The Firm of Charles W. Hills
Attys.

Patented June 14, 1949

2,473,480

UNITED STATES PATENT OFFICE 2,473,480

LOG IMPREGNATING DEVICE

Henry Svensson, New York, N. Y.; Agnes B. Svensson, administratrix of said Henry Svensson, deceased, assignor by mesne assignments, to Agnes B. Svensson, New York, N. Y.

Application March 9, 1943, Serial No. 478,529

1 Claim. (Cl. 21—63)

This invention relates to improvements in tree impregnating devices for use in impregnating freshly cut trees, logs or timber, by forcing out the sap and replacing it with the impregnant.

The principal object of the invention is the formation of a cap-head to match a given tree by sawing off a short length from one end of the tree, hollowing said length out to form a treating chamber therein, covering the hollowed out surfaces with means impervious to the impregnant, mounting fittings on said length for the compressed air, conduits for leading the impregnant into the chamber, and for purging air therefrom, said cap head being adapted to be thereafter secured to the log in substantially its original relation thereto.

Another object of the invention is the provision of a cap head formed by sawing off a length of the end of the tree to be treated, hollowing out the end of the tree from which said length is sawed to form a treating chamber therein, making the sawed end of said length impervious to the impregnant, forming valved passages in said length for connection to air and/or to the impregnant, and securing said length substantially in its original relation to the log and proceeding to force out the sap and to apply the impregnant.

A further object of the invention is to provide means for impregnating trees with material suitable for coloring, moisture-proofing, preserving, or otherwise treating the cellular structure of the wood.

Other objects and advantages of the invention will be apparent to those skilled in the art upon a study of the following specification and the accompanying drawings.

On the drawings:

Figure 1 is a cross-sectional view of a cap head secured to the broad end of a tree or log.

Figure 2 shows a system for the simultaneous treatment of two tree end portions.

As shown on the drawings:

Figure 1 shows a cut tree having a cap head 90 containing a curved surface 91 which is preferably impervious to the treating reagent, forming a treating chamber 10a' between the tree and the cap head 90. The cap head has a central aperture provided with a valved control conduit 9' for the admission of a fluid treating medium under pressure into treating chamber 10a'. Threaded conduit 9', containing valve 11 and pressure gauge 12, passes through a supporting plate 13 and is held therein by means of locking nut 14. The plate 13 is spaced from the cap head 90 by means of a bushing 15. The juncture of the tree end and the cap head 90 is secured by means of an annular clamping collar 16 acting against gasket 17, which is preferably made of a resilient material, such as cork. The collar 16 has threaded swivel bolts 18 pivotally attached thereto, the bolts 18 being secured against the plate 13 by means of wing nuts 19.

Figure 2 shows a tree portion T secured in holders AB'. The cap heads 90' are secured against the tree surfaces by means of screw members 94 containing nuts 94'. The treating chambers (TC) 91 formed by the cap head are fed from a high pressure fluid source through valved conduits as shown.

It will be apparent to those skilled in the art that many modifications of the invention herein shown and described may be made without departing from the principles of the invention, and it is not my intention to limit the invention other than as necessitated by the scope of the following claim.

I claim:

In an impregnating system for trees, logs and the like, in combination, a cap head comprising a length sawed off from the end of the tree to be impregnated and provided with a curved chamber extending into said length from the sawed end and with a through passage into said chamber, a valve controlled conduit connected to said passage and to sources of fluid media under pressure for admission of said media to said chamber, and clamping means for securing said length in fluid tight relation to the end of said tree in substantially its original positional relationship and for supporting said valve controlled conduit in its connected relation to said passage.

HENRY SVENSSON.

REFERENCES CITED

The following references are of record in the file of this patent:

UNITED STATES PATENTS

| Number | Name | Date |
|---|---|---|
| 109,027 | Lear | Nov. 8, 1870 |
| 748,033 | Angus | Dec. 29, 1903 |
| 1,142,610 | Norman | June 8, 1915 |

FOREIGN PATENTS

| Number | Country | Date |
|---|---|---|
| 109,990 | Austria | June 25, 1928 |